J. H. RODDEY.
SPEED CONTROL SYSTEM.
APPLICATION FILED MAY 14, 1919.

1,368,755.

Patented Feb. 15, 1921.
2 SHEETS—SHEET 1.

Inventor
John H. Roddey
By John W. Darley
Attorney

UNITED STATES PATENT OFFICE.

JOHN H. RODDEY, OF CHARLOTTE, NORTH CAROLINA.

SPEED-CONTROL SYSTEM.

1,368,755.  Specification of Letters Patent.  Patented Feb. 15, 1921.

Application filed May 14, 1919. Serial No. 296,996.

*To all whom it may concern:*

Be it known that I, JOHN H. RODDEY, a citizen of the United States, residing at Charlotte, in the county of Mecklenburg and State of North Carolina, have invented certain new and useful Improvements in Speed-Control Systems; and I do hereby declare the following to be a full, clear, and exact description of the invention, such as will enable others skilled in the art to which it appertains to make and use the same.

My invention relates to speed control systems.

One object of my invention is to provide a method of, and means for, controlling the speed of a prime mover so that the driving shaft of the latter will make a constant number of revolutions per minute.

A further object of my invention is to provide a method of, and means for, controlling the speed of a plurality of prime movers so that the driving shafts of the latter will make the same number of revolutions per minute.

A further object of my invention is to provide a method of, and means for, controlling the speed of a plurality of prime movers so that the driving shafts of the latter may make different numbers of revolutions per minute, whereby generators that are driven thereby may be caused to assume more or less of a general load carried by a plurality of generators.

A further object of my invention is to provide a method of, and means for, varying the speed of a prime mover from the standard speed.

In carrying out my invention I make use of the instrumentalities illustrated in the accompanying drawings, in which:

In Fig. 1 the parts to the right of the line 1—1 in Fig. 2 are omitted for the sake of clearness.

In the drawings:—

Figure 1:
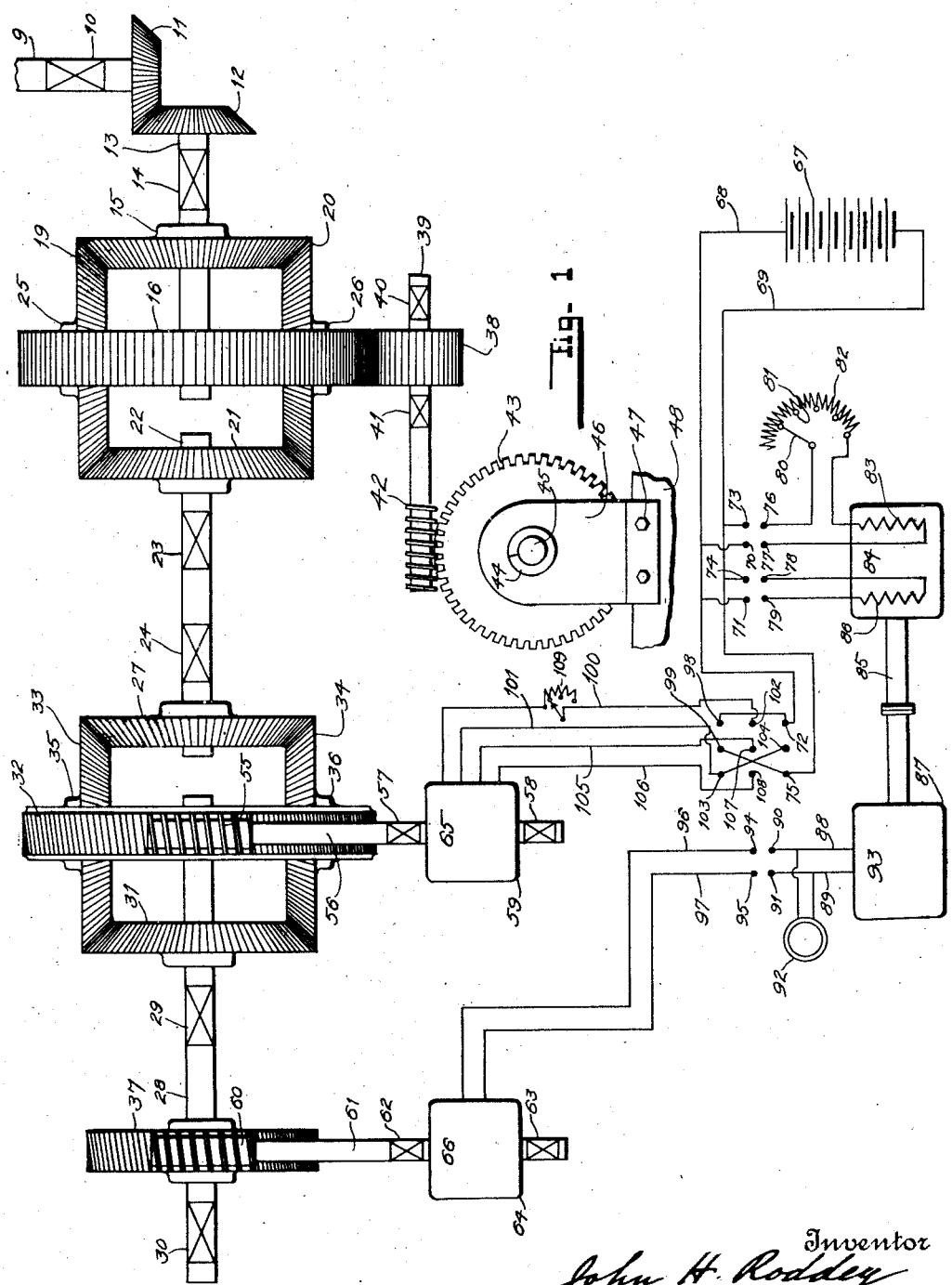
Figure 1 is a diagrammatic view showing the machine elements, electrical apparatus and the connections employed.
Figure 2:
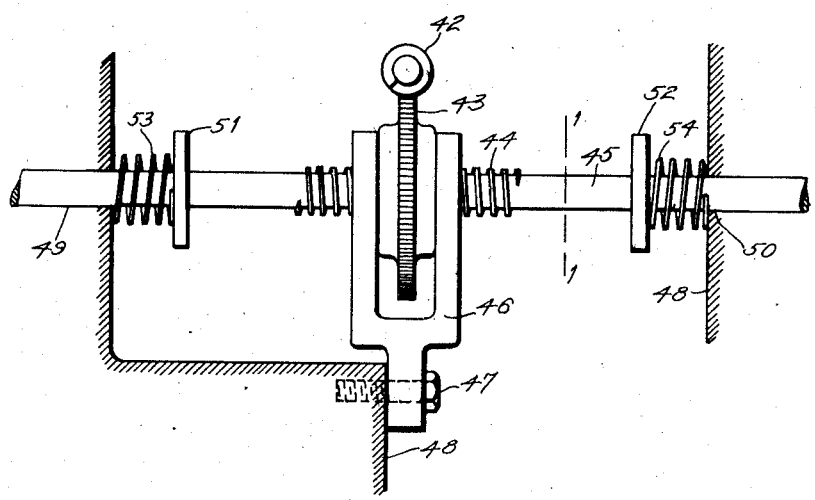
Fig. 2 is a detail view of certain of the machine elements used in actuating the valve of the prime mover.

9 represents a shaft driven in any approved manner by the shaft of a prime mover so that the angular speed of the shaft 9 will be either the same as or any multiple or sub-multiple of the angular speed of the shaft of the prime mover. Near its end, the shaft 9 is revolubly mounted as at 10 in a suitable bearing.

To the shaft 9 the bevel gear 11 is secured and said bevel gear meshes with the bevel gear 12 which is secured to the end of the shaft 13. The shaft 13 is mounted as at 14 in a suitable bearing (not shown), and upon said shaft near the center thereof there is rigidly mounted the bevel gear 15. Near the left end of the shaft 13 the spur gear 16 is revolubly mounted.

The spur gear 16 is provided with two studs 17 and 18 radially disposed inwardly, and upon said studs the bevel gears 19 and 20 are revolubly mounted. A bevel gear 21 is rigidly mounted upon the end of the shaft 22 and said shaft is revolubly mounted as at 23 and 24 in suitable bearings. The bevel gears 15 and 21 mesh with the bevel gears 19 and 20 and prevent displacement inwardly of the latter upon the studs 17 and 18. Outward displacement of the gears 19 and 20 is prevented by the shoulders 25 and 26 formed integrally with the spur gear 16.

The bevel gear 27 is rigidly mounted upon the left end of the shaft 22.

Figure 3:
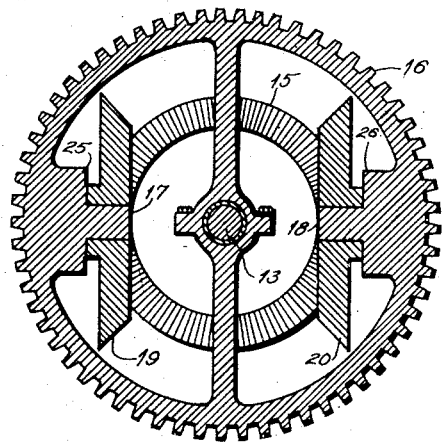
Fig. 3 is a section through the planetary gear used in my improved method, taken on a plane at right angles to the axis of rotation of the external gear.

A shaft 28 is revolubly mounted in bearings as at 29 and 30 and to the right of the bearing 29 there is rigidly secured upon the shaft 28 the bevel gear 31. Near the right end of the shaft 28 there is revolubly mounted upon the shaft 28 the worm wheel 32. The worm wheel 32 has studs similar to 17 and 18, (see Fig. 3), formed integrally therewith and upon said studs there are revolubly mounted the bevel gears 33 and 34. The worm wheel 32 is also provided with shoulders 35 and 36 similar to 25 and 26 to prevent outward displacement of the gears 33 and 34 upon their corresponding studs.

The worm wheel 37 is rigidly secured upon the shaft 28 between the bearings 29 and 30.

The spur gear 16 meshes with the pinion 38 and the latter is rigidly mounted upon the shaft 39. The shaft 39 is revolubly mounted as at 40 and 41 in suitable bearings and on the left end of the shaft 39 there is formed the worm 42 which meshes with the worm wheel 43. The worm wheel 43 is provided with a central cylindrical hole provided with a square thread in which is threaded the square thread 44 formed upon the valve stem 45. The worm wheel 43 is prevented from moving laterally by the prongs of the fork 46, the ends of which are provided with holes for the free passage therethrough of the thread 44, and the valve stem 45 is, in any approved manner, prevented from rotating.

The fork 46 is secured by bolts such as 47 to any suitable part as 48 of the bed used as an element of my improved speed control system. The valve stem 45 slides in suitable holes as at 49 and 50 provided in the bed 48 and any suitable connection, (not shown), is provided between the valve stem 45 and the valve of the prime mover, (not shown.)

Flanges such as 51 and 52 are formed upon the valve stem 45 in any suitable manner and springs such as 53 and 54 are placed upon the valve stem 45 between the flanges 51 and 52 and the abutting faces of the bed 48.

The worm 55 is formed upon the end of the shaft 56 and said shaft is revolubly mounted as at 57 and 58 in suitable bearings. Upon the shaft 56 between the bearings 57 and 58 there is formed a suitable armature provided with a commutator and the former revolves within the field 59.

Upon the commutator there bear suitable brushes. The worm 60 is formed upon the shaft 61 and meshes with the worm wheel 37. The shaft 61 is revolubly mounted in suitable bearings as at 62 and 63. Upon the shaft 61 between the bearings 62 and 63 there is mounted a suitable armature which revolves within the field 64.

The armature and commutator are each mounted upon the shaft 57 and the brushes for the latter, (all of which are omitted from the drawing for the sake of clearness), together constitute a direct current series motor 65.

The armature mounted upon the shaft 61, the collector rings and brushes therefor, (all of which are omitted from the drawings for the sake of clearness), together with the field 64, constitute a synchronous motor 66.

The bevel gears 15, 21, 27 and 31 are similar. The bevel gears 19, 20, 33 and 34 are also similar.

The bearings for the various shafts are to be mounted in any approved manner upon any suitable portion of the bed 48, and the various bearings have been omitted for the sake of clearness, as at 10, 14, 23, 24, 29, 30, 40, 41, 57, 58, 62 and 63. Said bearings may be of any approved type.

For the purpose of controlling the operation of the direct current series motor 65 and the synchronous motor 66, the following instrumentalities are provided:

67 is a storage battery which is to be provided with any suitable connections, switches and controlling devices for the charging thereof, and said battery is connected by the leads 68 and 69 respectively to the switch contacts 70, 71 and 72, and 73, 74 and 75. The switch contacts 70, 71, 73 and 74 are mounted upon a suitable base which also supports four swinging contact levers insulated from the base and also mutually insulated from each other. These levers are omitted from the drawings for the sake of clearness, but there is one of said levers articulated to each of the posts 76, 77, 78 and 79 which are mutually insulated and said levers, in the running position, will make connection respectively between the contacts 73, 70, 74 and 71 and the posts 76, 77, 78 and 79. The post 76 is connected to the contact arm 80, the end of which is arranged to make contact with any one of the series of contact buttons 81. The contact buttons 81 are connected at intervals to the resistance coil 82 and one end of said coil is connected to the shunt field 83 of the direct current shunt motor 84, the other end of said shunt field being connected to the post 77.

The motor 84 is provided with a suitable armature fixed upon the shaft 85 and the coils 86 of said armature are connected to a suitable commutator, upon which bear suitable brushes, through the intermediary of which the armature coils 86 are connected to the posts 78 and 79. The armature and commutator and brushes of the motor 84 are omitted from the drawings for the sake of clearness.

On the left end of the shaft 85 there is mounted an armature which revolves within the field 87, the latter being energized in any approved manner. The coils of the armature are connected to collector rings and upon the collector rings bear brushes which are connected to the leads 88 and 89, the latter being respectively connected to the posts 90 and 91.

A frequency indicator 92 is connected across the leads 88 and 89. The field 87, the armature therein, collector rings and brushes therefor, together constitute a single phase alternating current generator 93.

The contact points 94 and 95 are opposed, respectively, to the posts 90 and 91 and on the latter posts there are hung switch levers, (not shown), which are adapted to connect the leads 88 and 89 respectively to the leads 96 and 97. The leads 96 and 97 are connected to the brushes of the synchronous motor 66, the field 64 of which is energized in any approved manner.

The contact 72 is connected to the contact 98 and the contact 75 is connected to the contact 99. 100 and 101 are leads from the field coils to the direct current motor 65 and said leads are connected respectively to the switch post 102 and to the contacts 103 and 104. 105 and 106 are leads from the brushes of the motor 65 and said leads are connected respectively to the switch posts 107 and 108. Switch levers (not shown) are articulated upon the posts 102, 107 and 108, said levers being mutually insulated and capable of being moved either into contact with the contacts 72, 104 and 75 or into contact with the contacts 98, 99 and 103.

The operation of my improved speed control system is as follows:—

The prime mover being considered for the time being to be at rest, the switch levers articulated to the posts 76 and 77 are moved so as to connect the resistance coil 82 and field coil 83 across the leads 68 and 69, thus energizing the field of the motor 84. The switch levers articulated to the posts 78 and 79 are then moved to connect the armature coils 86 across the leads 68 and 69. If desired any suitable form of rheostat or starting box may be placed in series with the armature coils 86 so as to start the armature slowly, but the use of such rheostat or starting point being no part of my invention, has been omitted for the sake of clearness.

The field of the alternating current generator 93 is then to be energized in any approved way and the contact arm 80 moved until the speed of the shaft 85 is such that the frequency indicator 92 will show that the standard speed has been obtained or that the pre-determined variation from the standard speed has been obtained.

When the prime mover is driving alternating current generators, the frequency of the generator 93 is preferably the same as that of the main generators. The switch levers articulated to the posts 90 and 91 are then moved to make contact with the contacts 94 and 95 respectively, and the armature of the synchronous motor 66 is caused to revolve.

The means for starting the armature of the motor 66 and bringing the same to synchronism are no part of my invention, and for the sake of clearness, have been omitted from the drawings.

When the armature of the synchronous motor 66 revolves, the worm 60 is also revolved and the motion of said worm through the intermediary of the worm wheel 37 and shaft 28 causes the bevel gear 31 to revolve. Since the worm wheel 32 is prevented from revolving by the worm 55, the rotation of the bevel gear 31 is communicated to the bevel gear 27 through the bevel gears 33 and 34. The rotation of the gear 27 is communicated to the bevel gear 21 through the shaft 22; it being remembered that the shaft 9 connected with the main shaft to the prime mover is at rest and, consequently, the gear 15 being prevented from revolving it is evident that the revolution of the gear 21 will cause a revolution of the spur gear 16 upon the shaft 13. The revolution of the spur gear 16 through the intermediary of the pinion 38 and the shaft 39 revolves the worm 42 and thus the worm wheel 43 is revolved.

The mechanical connections between the shaft 61 and worm wheel 43 and between the valve stem 45 and the valve of the prime mover are such that when the worm wheel 43 is rotated, as just described, the screw thread in the central hole of said worm wheel acting upon the thread 44 will move the valve stem 45 so as to open the valve of the prime mover and start the rotation of the main shaft thereof and, consequently, of the shaft 9.

When the shaft 9 begins to rotate through the intermediary of the gears 11 and 12 and shaft 13, the bevel gear 15 will be rotated. The mechanical connections between the main shaft and the prime mover and the bevel gear 15 are such that when the prime mover is rotating, said bevel gear will rotate in a direction opposite to the rotation of the bevel gear 21; consequently, as the speed of rotation of the shaft of the prime mover increases, the speed of the rotation of the spur gear 16 will diminish until the speeds of the gears 15 and 21 are the same. When equality of the speeds of rotation of the bevel gears 15 and 21 obtains, further motion of the spur gear 16 and valve stem 45 is prevented.

Should the speed of the prime mover increase so that the speed of rotation of the bevel gear 15 is greater than the speed of rotation of the bevel gear 21, then the spur gear 16 will be moved in a direction opposite to the direction in which it has been moving, as just explained, and, consequently, the direction of rotation of the worm 42 will be reversed. This produces motion of the valve stem 45 which acts to close the valve of the prime mover; hence, it is evident that by these means the speed of the prime mover can be maintained either upon a parity with the speed of the shaft 28 or any multiple or sub-multiple thereof.

If at any time the rotation of the worm wheel 43 in either direction is considerable this will result in the thread 44 passing from engagement with the central threaded hole of said worm wheel. Since the valve stem 45 moves in either direction against the pressure of one of the springs 53 and 54, it is evident that when the thread 44 is out of engagement with the threaded hole, as just described, nevertheless, the end of said thread is kept pressed against the end of the thread in said hole by the corresponding spring and, consequently, as soon as the worm wheel 43 is revolved in the opposite direction, reëngagement of the thread 44 with the threaded hole thereof begins and the corresponding motion of the valve stem 45 results.

By the means just described, a constant relationship between the speed of the shafts 9 and 28 is maintained, but it may be desirable at times to vary this relationship, as for instance, when it may be desired to either reduce or increase the speed of a generator driven by the prime mover in order that it shall assume either less or more of a general load carried by a plurality of generators.

In order to effect this alteration in the speed of the generator, the switch levers articulated to the posts 102, 107 and 108 are moved into contact with either the contacts 98, 99 and 103 or into contact with the contacts 72, 104 and 75 in order to revolve the armature of the motor 65 in the proper direction.

There is to be a suitable rheostat 109 included in series with the lead 100 so that the speed of said armature may be varied as desired. When said armature is revolved it turns the worm 55 in either direction, thus revolving the worm wheel 32 in either direction and through the intermediary of the bevel gears 33 and 34 the speed of the bevel gear 27 is either increased or diminished, it being remembered that the bevel gear 31 is revolving at a constant speed. When the speed of the bevel gear 27 is increased or diminished, the speed of the bevel gear 21 is also increased or diminished and a corresponding motion of the spur gear 16 results, which eventuates in an appropriate movement of the valve stem 45 and the speed of the prime mover is either increased or diminished.

While I have shown and described my improved speed control system as arranged for controlling the valve of a prime mover such as a steam, internal combustion or other engine, it is evident that said valve stem may be used to control the speed of a water wheel of any type or it may be used to control the regulating devices of an electric motor.

It is also evident that any number of synchronous motors such as 66 may be connected to the leads 96 and 97 and thus any number of prime movers may be caused to run at the same speed or at any relative speeds.

It is also evident that a plurality of synchronous motors such as 66 may be used to control generators in the same power plant or generators in power plants which are widely separated from each other.

While I have shown and described one preferable embodiment of my invention for establishing a speed standard, maintaining a constant relation between the speed of said standard and the speed of prime movers and for varying said relations at will, it is to be understood that I do not limit myself to the exact structures and modes of use set forth, but that many variations may be made therein without departing from the spirit of my invention.

I claim:—

1. The herein described method of controlling the speed of a prime mover which consists in operating a control element by driving an alternating current generator at a constant speed, delivering power from said generator to a synchronous motor, driving a gear by said motor, driving a gear by said mover, moving said element by said gears to keep the speed of said mover in constant ratio to the speed of said generator and moving the gear driven by said motor by auxiliary means to vary said ratio.

2. The herein described method of controlling the speed of a plurality of prime movers which consists in operating a control element by driving an alternating current generator at a constant speed, delivering power from said generator to a plurality of synchronous motors, driving a gear by each of said motors, driving a gear by each of said movers and moving the corresponding element by said gears to keep the speed of the corresponding mover in constant ratio to the speed of said generator.

3. The herein described method of controlling the speed of a plurality of prime movers each including an element for controlling the speeds thereof which consists in driving an alternating current generator at a constant speed, delivering power from said generator to a plurality of synchronous motors, driving a gear by each of said motors, driving a gear by each of said movers, moving the corresponding element by said gears to keep the speed of the corresponding mover in constant ratio to the speed of said generators and moving the gear driven by each of said motors by auxiliary means to independently vary the ratio of the speed of each mover to the speed of said generator.

4. In a speed control system, the combination with a prime mover and an alternating current generator driven at a constant speed, of a synchronous motor connected with said generator, a bevel gear driven by said motor, a bevel gear driven by said mover, a spur gear, a pair of bevel gears carried by said spur gear and meshing with said first named bevel gears and a controlling element for said mover operated by said spur gear.

5. In a speed control system, the combination with a prime mover and an alternating current generator driven at a constant speed, of a synchronous motor connected with said generator, a bevel gear driven by said motor, a bevel gear driven by said mover, a spur gear, a pair of bevel gears carried by said spur gear and meshing with said first named bevel gears, a controlling element for said mover operated by said spur gear and means for varying the speed of said gear driven by said motor independently of the speed of said motor.

6. In a speed control system, the combination with a prime mover and an alternating current generator driven at a constant speed, of a synchronous motor connected with said generator, a bevel gear driven by said motor, a worm wheel, a pair of bevel gears carried by said worm wheel and meshing with said bevel gear, a spur wheel, a pair of bevel gears carried by said spur wheel, bevel gears driven by said mover and meshing with the bevel gears carried by said spur wheel, a shaft and a pair of bevel gears mounted thereupon, each of said gears meshing with one of said pairs of bevel gears, a controlling element for said prime mover, means for moving said element by said spur gear, and means for rotating said worm wheel.

7. In a speed control system, the combination with a prime mover and an alternating current generator driven at a constant speed, of a synchronous motor connected with said generator, a bevel gear driven by said motor, and a planetary worm wheel connected to said bevel gear, a bevel gear driven by said mover and a planetary spur gear driven by said bevel gear, mechanical connections between said planetary gears, a controlling element for said mover operated by said spur gear and a motor for independently rotating said worm wheel.

In testimony whereof I affix my signature.

JOHN H. RODDEY.